United States Patent
Guiette, III et al.

(10) Patent No.: US 6,754,959 B1
(45) Date of Patent: Jun. 29, 2004

(54) HAND-HELD, CARTRIDGE-ACTUATED CUTTER

(76) Inventors: William E. Guiette, III, P.O. Box 160, Pine Valley, CA (US) 91962; Charles W. Arnold, P.O. Box 838, Descanso, CA (US) 91916

(*) Notice: Subject to any disclaimer, the term of this patent is extended or adjusted under 35 U.S.C. 154(b) by 0 days.

(21) Appl. No.: 10/414,504

(22) Filed: Apr. 15, 2003

(51) Int. Cl.[7] ................................................ B26D 1/06
(52) U.S. Cl. .......................... 30/90.1; 30/92; 30/228; 30/241; 114/221 A; 227/10
(58) Field of Search ................. 30/92, 180, 182, 30/228, 241, 277, 278, 90.1, DIG. 4; 227/9, 10; 114/221 A

(56) References Cited

U.S. PATENT DOCUMENTS

| | | |
|---|---|---|
| 2,140,214 A | 12/1938 | Temple |
| 2,716,813 A | 9/1955 | Smyres |
| 2,766,525 A | 10/1956 | Hoffman |
| 3,003,235 A | 10/1961 | Temple et al. |
| 3,353,445 A | 11/1967 | Temple et al. |
| 3,474,533 A | 10/1969 | Peck |
| 3,643,329 A | 2/1972 | Lieberman |
| 3,763,738 A | 10/1973 | Temple |
| 3,780,689 A * | 12/1973 | Giebel et al. ............. 114/221 A |
| 3,805,433 A * | 4/1974 | Passer ............................. 42/11 |
| 3,886,842 A * | 6/1975 | Giebel et al. ................ 89/1.14 |
| 4,026,028 A | 5/1977 | Green |
| 4,349,141 A | 9/1982 | Ollivier et al. |
| 4,587,733 A | 5/1986 | Staempfli |
| 4,826,103 A * | 5/1989 | McKown ..................... 244/1 R |
| 5,465,490 A * | 11/1995 | Smith et al. .................. 30/180 |
| 5,722,170 A | 3/1998 | Smith |
| D404,627 S | 1/1999 | Hirabayashi |
| 6,349,474 B1 | 2/2002 | Jordan |

* cited by examiner

*Primary Examiner*—Hwei-Siu Payer
(74) *Attorney, Agent, or Firm*—Calif Tervo

(57) ABSTRACT

Cartridge-actuated cutter (10), held in a single hand, generally includes frame (20) and barrel assembly (40). Frame (20) includes grip (26), trigger (30) firing pin (28), and pivot mount (35). Barrel assembly (40) generally includes barrel (41), piston (70), and extractor (80). Barrel (41) includes anvil (52), cable receiving recess (55), breech bore (61) for receiving a cartridge, and longitudinal bore (64). Piston front end (74) includes chisel (75) and stop (76). Detonation of the cartridge drives piston (70) forward from a cocked position to cut a cable in recess (55) against anvil (52). Extractor (80) slides rearward to simultaneously eject a cartridge and cock piston (70). Stop (76) impacts anvil (52) simultaneously with chisel (75). Anvil (52) is repositionable so as to present different surfaces to chisel (75). Barrel (41) includes second pivoting mount (45) for repositioning recess (55) relative to frame (20).

15 Claims, 3 Drawing Sheets

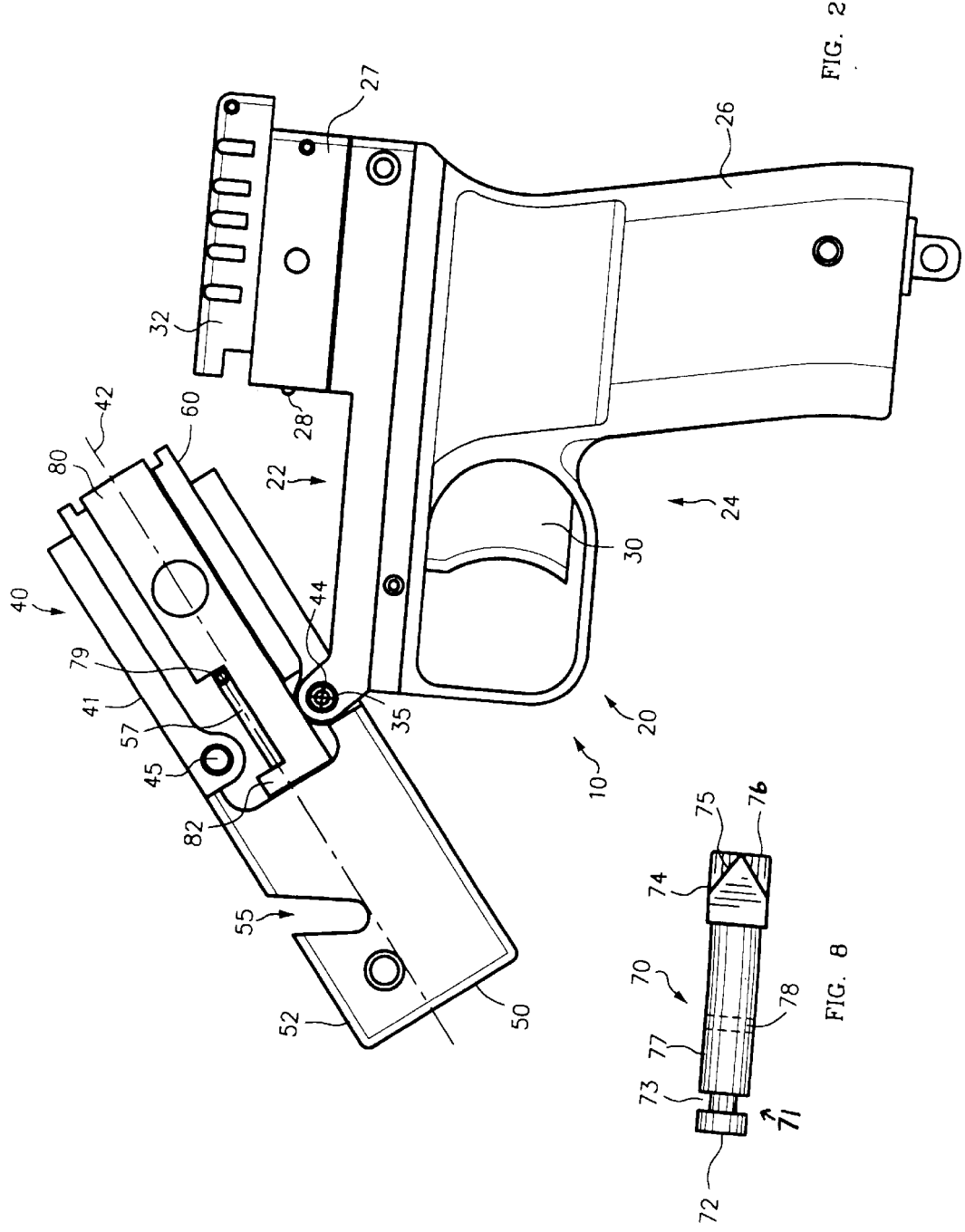

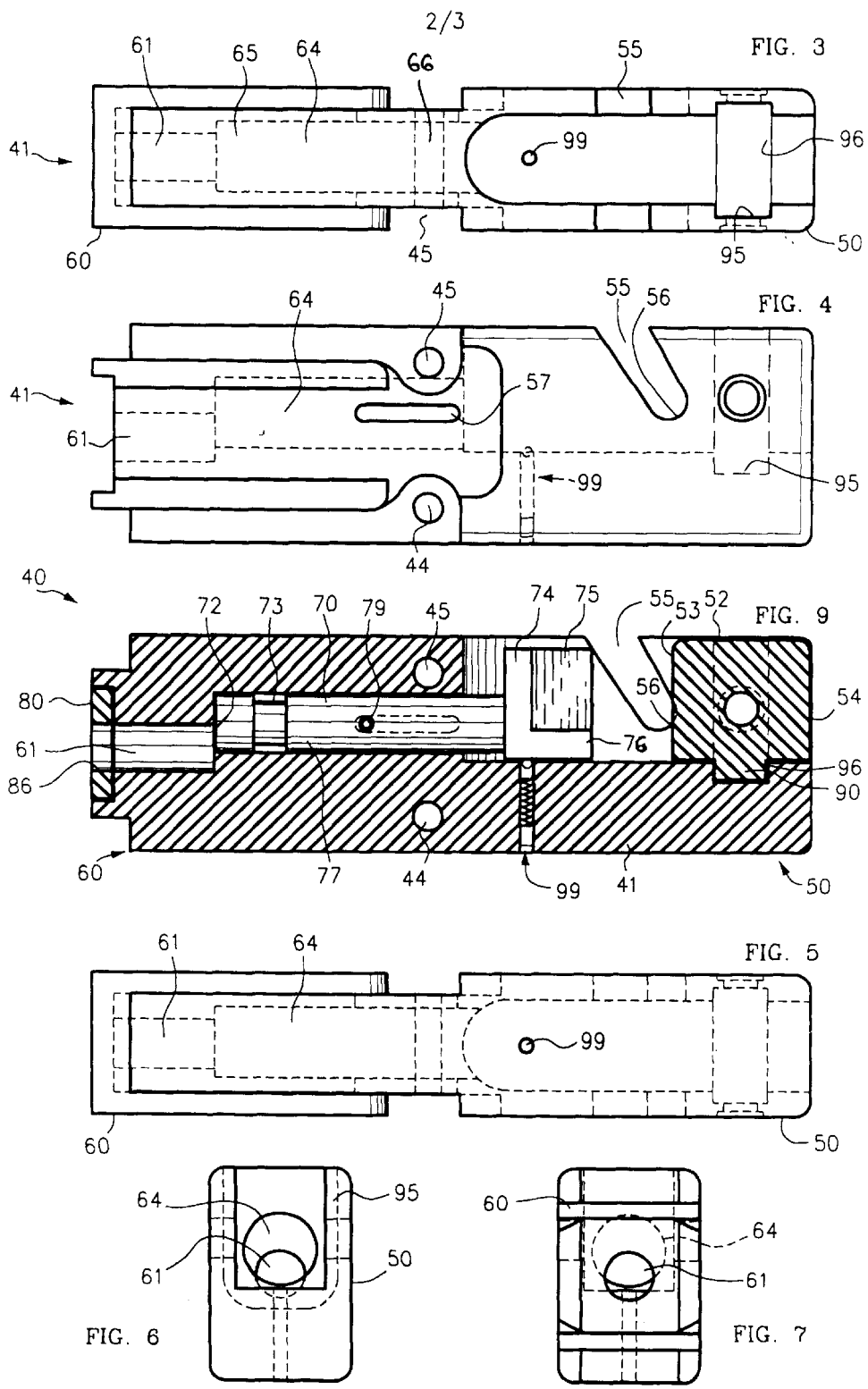

HAND-HELD, CARTRIDGE-ACTUATED CUTTER

FIELD OF THE INVENTION

This invention relates in general to cutters, such as for cables, and more particularly to a cartridge-actuated cutter that is held in one hand.

SUMMARY OF THE INVENTION

A hand-held, cartridge-actuated cutter generally includes a frame and a barrel assembly. The frame includes a grip for gripping by a user's hand, a trigger, firing pin, and a pivot mount. The barrel assembly generally includes a barrel, a piston, and an extractor. The barrel includes a first pivot mount for cooperating with the frame mount for mounting the barrel assembly on the frame, a front end including an anvil and a laterally opening cable receiving recess for holding a cable adjacent the anvil, a rear end including a breech bore for receiving a cartridge, and a longitudinal bore. The piston has a front end including a cutter, such as a chisel, and a stop surface. The piston is reciprocable in the longitudinal bore and moves forward from the cocked position responsive to detonation of a cartridge such that the chisel cuts a cable held in the recess against the anvil.

The extractor slides rearward to simultaneously eject a cartridge and cock the piston. The stop impacts the anvil simultaneously with the chisel so as to lessen damage to said anvil. The anvil is repositionable so as to present different surfaces to the chisel. The barrel includes a second pivoting mount for cooperating with the frame mount for selectively mounting the barrel assembly on the frame so as to reposition the cable recess.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 2 is a left elevation view of the device with the barrel assembly pivoted to the open breech position.

FIG. 3 is a top plan view of the barrel.

FIG. 4 is a side elevation view of the barrel.

FIG. 5 is a bottom plan view of the barrel.

FIG. 6 front elevation view of the barrel.

FIG. 7 is a rear elevation view of the barrel.

FIG. 8 is a top elevation view of the piston.

FIG. 9 is a side cross section of the barrel assembly.

DETAILED DESCRIPTION OF THE INVENTION

Figure 1:
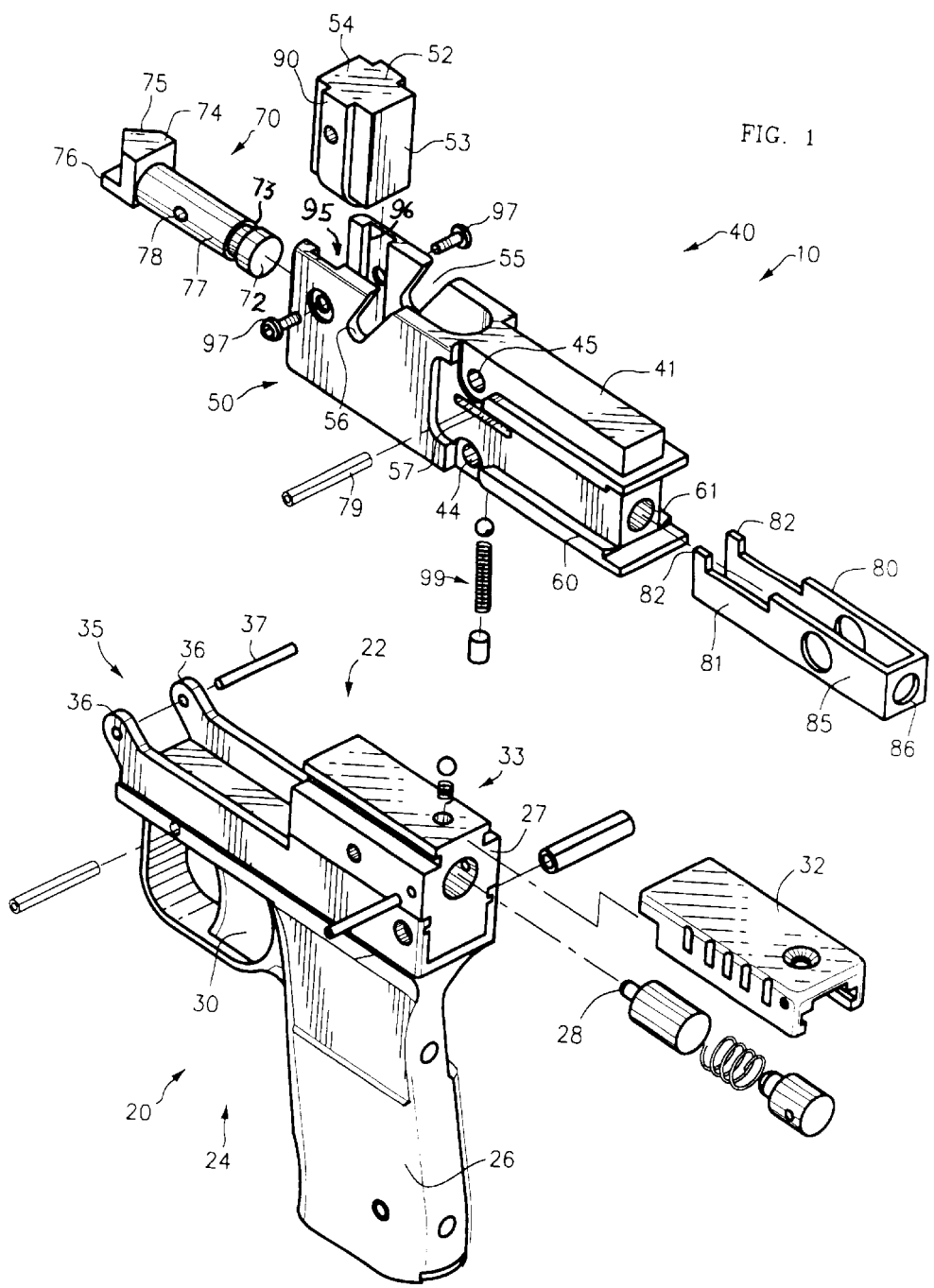
FIG. 1 is a top, left, rear exploded view of an exemplary embodiment of the hand-held, cartridge-actuated cutting device of the invention.

FIG. 1 is a top, left, rear exploded view of an exemplary embodiment of the hand-held, cartridge-actuated cutting device 10 of the invention. FIG. 2 is a left elevation view of the device 10 with a barrel assembly 40 pivoted to the open breech position. Device 10 receives and cuts a workpiece, such as a cable or other rod-like element. Device 10 generally comprises a frame 20 having a first side 22 and a second side 24 opposite first side 22, a grip 26 for gripping by a user's hand for holding device 10, a breech block 27, detonating means, such as firing pin 28, for detonating a cartridge, a trigger 30 for activating firing pin 28, a latch 32, and mounting means 35, such a hinge joints 36 and pivot pin 37, for pivotly mounting barrel assembly 40 to frame 20.

Trigger 30 is disposed for manipulation by a finger of the user's gripping hand. Grip 26 is configured for gripping such that frame 20 can only be oriented in the user's hand in one configuration. That is, frame 20 cannot be rotated in a user's hand.

Latch 32 is slideably mounted on breech block 27. Latch 32 is selectively slidable by a user between a forward, latched, position wherein it engages barrel assembly 40 and prevents barrel assembly 40 from pivoting, to a rearward, open, position, shown in FIG. 2, wherein latch 32 is disengaged from barrel assembly 40 such that barrel assembly 40 is pivotable for loading or unloading of a cartridge. A detent assembly 33 in breech block retains latch 32 in the latched position.

Although the frame 20 shown is of an automatic pistol configuration, it will be apparent that other frame configurations can be used including a grip having a longitudinal axis more aligned with the longitudinal axis of barrel assembly 40. Also, although a firing pin 28 is shown, other detonating means, such as a hammer, are well known in the art and could be used.

As best seen in FIG. 1, barrel assembly 40 generally comprises a barrel 41 including an anvil 52, a piston 70, and an extractor 80.

Barrel 41 is shown in FIG. 3 in top plan view, in FIG. 4 in side elevation view, in FIG. 5 in bottom plan view, in FIG. 6 in front elevation view, and in FIG. 7 in rear elevation view. FIG. 8 is a top elevation view of piston 70. FIG. 9 is a side cross sectional view of barrel assembly 40.

Barrel 41 has a longitudinal axis 42. Barrel 41 includes first mounting means, such as first hinge joint 44 for cooperating with frame mounting means 35 for pivotly mounting barrel 41 on frame 20, as shown. Barrel 41 has a front end 50 including an anvil 52 and a laterally opening workpiece receiving recess 55 to the rear of anvil 52 including a cradle 56 for holding a workpiece therein adjacent anvil 52. Barrel 41 has a rear end 60 including a breech bore 61 therein for receiving an explosive device, such as a blank cartridge; not shown. Barrel 41 includes a piston bore or longitudinal bore 64 including a rear end 65 in fluid communication with breech bore 61 and a front end 66 that opens on workpiece receiving recess 55.

Piston 70, in longitudinal bore 64, has a rear end 71 that includes a rear surface 72 for being pushed on by gasses from a detonated cartridge and a cleaning groove 73 for accumulation of powder residue, a front end 74 including a cutter, such as chisel 75, and a generally elongate cylindrical body 77. Piston 70 is reciprocable in longitudinal bore 64 between a rear position and a forward position. Piston 70 moves to the forward position responsive to detonation of a cartridge in breech bore 61 such that chisel 75 moves across recess 55 for cutting a workpiece held in cradle 56 against anvil 52. Piston front end 74 includes al impact surface, such as stop 76 of suitable area, which impacts anvil 52 simultaneously with chisel 75 so as to lessen damage to anvil 52. Piston cocking pin 79 is disposed through slots 57 on each side of barrel 41, and through bore 78 in cylindrical body 77 of piston 70 such that its free ends protrude from slots 57. A piston detent assembly 99, mounted in barrel 41, retains piston 70 in the cocked position.

Anvil 52 includes a first striking surface 53, a second striking surface 54, and an anvil compression shoulder 90 that is U-shaped in transverse cross section. Barrel 41 includes a cavity 95 for receiving anvil 52. Cavity 95 includes a cavity compression shoulder 96 that is generally U-shaped in transverse cross section for bearing against anvil compression shoulder 90 for absorbing impact of cutting from anvil 52. Anvil 52 is attached to barrel 41 by insertion into cavity 95 in barrel 41 and fastening to both side walls of cavity 95 with fasteners, such as cap screws 97. Cap screws 97 hold the sides of barrel 41 together during impact from cutting. Compression shoulder 90 transfers the recoil of the cutting action onto three walls of barrel 41. Anvil 52 is adapted, such as by being longitudinally symmetrical, to be selectively repositionable such that either first surface 53 or second surface 54 receive chisel 75. In this manner, the working life of anvil 52 is lengthened. Chisel 75 and anvil 52 may be made of many suitable materials well-known in the art.

Extractor 80 is slideably mounted on barrel 41 and includes a front end 81 including chisel engaging means, such as hooks 82, that engage the free ends of piston cocking pin 79. Extractor 80 includes a rear end 85 including cartridge engaging means, such as orifice 86 for receiving a cartridge. Extractor 80 is reciprocable between a forward position and a rearward position such that upon movement to the rearward position, hooks 82 engage free ends of piston pin 79 and move piston 70, and hence chisel 75, to the rear position and orifice 86 engages a cartridge (not shown), such as the rim of a cartridge, in breech bore 61 and extracts the engaged cartridge from breech bore 61.

Barrel 41 is adapted, such as with centrally-located breech bore 61 and second mounting means, such as second hinge joint 45, for cooperating with frame mounting means 35, for pivotally mounting barrel 41 on frame 20 so as to reposition workpiece receiving recess 55 from first side 22 of frame 20 to second side 24 of frame 20. Thus, barrel 41 can be rotated 180° about its longitudinal axis so that recess 55 is on side 24 of frame 20. This position of recess 55 may be desirable for some cutting situations.

Because device 10 is small, light-weight, and held by a single hand, it is particularly useful in situations where quick, one-hand operation is necessary, such as cutting a helicopter hoist cable in an emergency. Device 10 functions like a pistol such that anyone familiar with pistols requires very little training in its use. Repositioning recess 55 as described above adapts device 10 for cutting in different positions.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

What is claimed is:

1. A hand-held, cartridge-actuated cutting device comprising:
   a frame including:
      a first side;
      a second side opposite said first side;
      a grip for gripping by a user's hand for holding said cutting device;
      detonating means for detonating a cartridge;
      trigger means for activating said detonating means; and
      mounting means;
   a barrel assembly having a longitudinal axis; said barrel assembly including:
      first mounting means for cooperating with said frame mounting means for mounting said barrel assembly on said frame;
      a front end including:
         a laterally opening workpiece receiving recess including:
            a cradle for holding a workpiece;
      a rear end including:
         a breech bore therein for receiving a cartridge;
      a longitudinal bore including:
         a rear end in fluid communication with said breech bore; and
         a front end that opens on said workpiece receiving recess; and
      a piston in said longitudinal bore having:
         a rear end; and
         a front end including:
            a cutter; said piston reciprocable between a rear position and a forward position and movable to the forward position responsive to detonation of a cartridge such that said cutter moves across said recess for cutting a workpiece held in said cradle; and wherein said barrel assembly is adapted for selectively repositioning said workpiece receiving recess from said first side of said frame to said second side of said frame.

2. The device of claim 1 wherein:
said first mounting means of said barrel assembly pivotally attaches said barrel assembly to said frame.

3. The device of claim 1 wherein:
said front end of said barrel assembly includes
   an anvil; and wherein said laterally opening workpiece receiving recess is located to the rear of said anvil such that said cradle holds a workpiece therein adjacent said anvil, and wherein:
      said cutter includes:
         a chisel for cutting said workpiece against said anvil.

4. The device of claim 3 wherein:
said anvil includes:
   a first surface; and
   a second surface, said anvil being selectively repositionable such that either said first surface or said second surface receive said cutter.

5. The device of claim 3 wherein:
said barrel assembly includes:
   a barrel including:
      a cavity for receiving said anvil including:
         a compression shoulder that is generally U-shaped in transverse cross section; and
   said anvil is disposed in said cavity and includes:
      a generally U-shaped compression shoulder for transferring cutting impact to said compression shoulder of said cavity.

6. The device of claim 1 wherein:
said barrel assembly includes
   second mounting means for cooperating with said frame mounting means for selectively mounting said barrel assembly on said frame so as to reposition said workpiece receiving recess from said first side of said frame to said second side of said frame.

7. The device of claim 6 wherein:
said first mounting means of said barrel assembly pivotally attaches said barrel assembly to said frame; and said second mounting means of said barrel assembly pivotally attaches said barrel assembly to said frame.

8. The device of claim 3 wherein:

said barrel assembly includes:
   an extractor including:
      a front end including:
         chisel engaging means; and
      a rear end including:
         cartridge engaging means; said extractor reciprocable between a forward position and a rearward position such that upon movement to the rearward position said chisel engaging means engages said chisel and moves said chisel to the rear position and said cartridge engaging means engages a cartridge in said breech bore and extracts the engaged cartridge.

9. The device of claim 3 wherein:

said piston front end includes:
   an impact surface for impacting said anvil simultaneously with said chisel so as to lessen damage to said anvil.

10. A hand-held, cartridge-actuated cutter comprising:

a frame including:
   a first side,
   a second side opposite said first side;
   a grip for gripping by a user's hand for holding said cutter;
   detonating means for detonating a cartridge;
   trigger means for activating said detonating means; and
   mounting means; and a barrel assembly including:
   a barrel having a longitudinal axis, said barrel including:
      first mounting means for cooperating with said frame mounting means for mounting said barrel assembly on said frame;
      a front end including:
         an anvil; and
         a laterally opening workpiece receiving recess to the rear of said anvil including:
            a cradle for holding a workpiece adjacent said anvil;
      a rear end including:
         a breech bore therein for receiving a cartridge;
      a longitudinal bore including:
         a rear end in fluid communication with said breech bore; and
         a front end that opens on said workpiece receiving recess; and
   a piston in said longitudinal bore having:
      a rear end; and
      a front end including:
         a chisel, said piston reciprocable between a rear position and a forward position and movable to the forward position responsive to detonation of a cartridge such that said chisel moves across said recess for cutting a workpiece held in said cradle; and an extractor mounted to said barrel including:
      a front end including:
         chisel engaging means; and
      a rear end including:
         cartridge engaging means, said extractor reciprocable between a forward position and a rearward position such that upon movement to the rearward position said chisel engaging means engages said chisel and moves said chisel to the rear position and said cartridge engaging means engages a cartridge in said breech bore and extracts the engaged cartridge.

11. The device of claim 10 wherein:

said barrel includes:
   second mounting means for cooperating with said frame mounting means for selectively mounting said barrel assembly on said frame so as to reposition said workpiece receiving recess from said first side of said frame to said second side of said frame.

12. The device of claim 11 wherein:

said first mounting means of said barrel assembly pivotally attaches said barrel assembly to said frame; and said second mounting means of said barrel assembly pivotally attaches said barrel assembly to said frame.

13. A hand-held, cartridge-actuated cutter comprising:

a frame including:
   a first side;
   a second side opposite said first side;
   a grip for gripping by a user's hand for holding said cutter;
   detonating means for detonating a cartridge;
   trigger means for activating said detonating means; and
   mounting means; and a barrel assembly having a longitudinal axis, said barrel assembly including:
   first mounting means for cooperating with said frame mounting means for mounting said barrel assembly on said frame;
   a front end including:
      an anvil; and
      a laterally opening workpiece receiving recess to the rear of said anvil including:
         a cradle for holding a workpiece adjacent said anvil; a rear end including:
         a breech bore therein for receiving a cartridge;
         a longitudinal bore including:
            a rear end in fluid communication with said breech bore; and
            a front end that opens on said workpiece receiving recess; and a piston in said longitudinal bore having:
         a rear end; and
         a front end including:
            a chisel; and
            an impact surface; said piston reciprocable between a rear position and a forward position and movable to the forward position responsive to detonation of a cartridge such that, upon movement to the forward position, said chisel moves across said recess for cutting a workpiece held in said cradle against said anvil and said impact Surface impacts said anvil simultaneously with said chisel so as to lessen damage to said anvil.

14. The cuter of claim 13 wherein:

said barrel assembly includes:
   second mounting means for cooperating with said frame mounting means for selectively mounting said barrel assembly on said frame so as to reposition said workpiece receiving recess from said first side of said frame to said second side of said frame.

15. The cutter of claim 14 wherein:

said first mounting means of said barrel assembly pivotally attaches said barrel assembly to said frame; and said second mounting means of said barrel assembly pivotally attaches said barrel assembly to said frame.

* * * * *